(12) United States Patent
Son (10) Patent No.: US 10,907,923 B2
(45) Date of Patent: Feb. 2, 2021

(54) SHOOTING SYSTEM USING LASER BEAM

(71) Applicant: Venport Inc., Seoul (KR)

(72) Inventor: Jin Woon Son, Seoul (KR)

(73) Assignee: VENPORT INC., Seoul (KR)

( * ) Notice: Subject to any disclaimer, the term of this patent is extended or adjusted under 35 U.S.C. 154(b) by 337 days.

(21) Appl. No.: 15/756,311

(22) PCT Filed: Aug. 31, 2016

(86) PCT No.: PCT/KR2016/009699
§ 371 (c)(1),
(2) Date: Feb. 28, 2018

(87) PCT Pub. No.: WO2017/039302
PCT Pub. Date: Mar. 9, 2017

(65) Prior Publication Data
US 2018/0252491 A1    Sep. 6, 2018

(30) Foreign Application Priority Data

Sep. 2, 2015 (KR) .......................... 10-2015-0124133

(51) Int. Cl.
| | |
|---|---|
| *F41A 33/02* | (2006.01) |
| *F41J 5/02* | (2006.01) |
| *F41J 5/14* | (2006.01) |
| *F41G 3/26* | (2006.01) |
| *F41J 9/14* | (2006.01) |
| *G09B 9/00* | (2006.01) |

(52) U.S. Cl.
CPC ............ *F41A 33/02* (2013.01); *F41G 3/2605* (2013.01); *F41G 3/2655* (2013.01); *F41G 3/2694* (2013.01); *F41J 5/02* (2013.01); *F41J 5/14* (2013.01); *F41J 9/14* (2013.01); *G09B 9/003* (2013.01)

(58) Field of Classification Search
CPC ........................................................ F41A 33/02
USPC ............................................................ 434/21
See application file for complete search history.

(56) References Cited

FOREIGN PATENT DOCUMENTS

| | | |
|---|---|---|
| JP | 2004324974 | 11/2004 |
| KR | 19990045317 | 6/1999 |
| KR | 20010104024 | 11/2001 |
| KR | 100377656 | 3/2003 |
| KR | 100403921 | 11/2003 |
| KR | 200360730 | 9/2004 |

(Continued)

OTHER PUBLICATIONS

International Search Report—PCT/KR2016/009699 dated Dec. 16, 2016.

*Primary Examiner* — Kesha Frisby
(74) *Attorney, Agent, or Firm* — Cantor Colburn LLP (57) ABSTRACT

Provided is a shooting training system using a laser beam comprising: a beam projector that projects training images for various types of shooting onto a shooting screen; a shooting device that applies a laser beam to an aiming point on the shooting screen when a user aims at the aiming point and pulls a trigger; a camera module that photographs the laser beam applied to the shooting screen; a computer device that determines whether the laser beam has hit the target area of the shooting training image projected onto the shooting screen by comparing the target area and the point where the laser beam has been detected, and outputs an image and a sound according to the determination result; and a control unit that detects whether the shooting device has been fired and when the shooting device was fired.

4 Claims, 4 Drawing Sheets

(56) References Cited

FOREIGN PATENT DOCUMENTS

| KR | 20080001067 | 1/2008 |
| KR | 20130022157 | 3/2013 |
| KR | 20140112117 | 9/2014 |

SHOOTING SYSTEM USING LASER BEAM

TECHNICAL FIELD

The present invention relates to a shooting training system and, more particularly, to a shooting training system using a laser beam.

BACKGROUND ART

Conventionally, a marksmanship training apparatus using a laser beam basically includes a laser beam launcher and a laser beam reception unit and in particularly basically includes an invention related to a laser beam reception unit.

The structure of the laser beam reception unit of the conventional shooting training apparatus is described. There are methods of integrating the laser beam launcher and the light reception unit so that a laser beam is reflected by a target (Korean Patent No. 10-0403921), implementing the laser beam reception unit using an electrical detect on device (Korean Patent Application No. 10-2000-0025393), adopting a wave detection device that detects the vibration of air (Korean Patent No. 10-0377656), receiving a laser beam through a light-receiving diode (Utility Mode No. 20-0360730), etc.

In particular, from among the conventional shooting training apparatuses, the method using the light-receiving diode has wide applications, but has a complicated construction because several tens or several hundreds of light-receiving diodes must be disposed a lattice form. The method has problems that there is a malfunction of light detection if a laser beam is radiated to a light-receiving diode that does not normally operate and in inefficiency that the entire lattice must be changed if one or some of light-receiving diodes disposed the lattice do not normally operate.

Furthermore, the method using the light-receiving diode has a problem in that a light-receiving diode responding to a laser beam of a specific wavelength reflects disturbance beam, such as natural light (sun), a fluorescent lamp or an incandescent lamp, and malfunctions.

Furthermore, in the case of a conventional shooting training apparatus using an invisible laser, zeroing and adjustment are impossible because a shooter cannot check an aimed and fired shooting training system that requires precision cannot be implemented due to problems, such as if a hit point of a laser is not captured or another point is recognized as a hit point or a hit point is not precisely captured.

DISCLOSURE

Technical Problem

An object of the present invention is to provide a laser beam firing system that enables target shooting training and game by projecting a shooting training image on a screen not equipped with a separate detection device and firing laser beam of a gun.

Additional characteristics and advantages of the present invention will be described in the following description and may become partially evident by the description or through the execution of the present invention. Objects and other advantages of the present invention may be implemented by structures written in the claims, in particular, in addition to the following description and the accompanied drawings.

TECHNICAL SOLUTION

Advantageous Effects

The present invention implements the shooting training system using a laser beam so that whether a target was hit can be checked in such a manner that a laser beam appears at an aimed point upon firing. Furthermore, a psychological effect and attributes obtained through shooting have been reproduced without any change because a user can check his or her zeroing with the naked eye.

Furthermore, in the present invention, the laser filter 450 is mounted on the camera module 400 so that the camera module 400 recognizes only a laser beam of a gun other than surrounding light sources (e.g., natural light (sun), the light source of a beam projector, a fluorescent lamp or an incandescent lamp) within shooting range. A conventional error that the firing point of a laser beam was not captured or another point was recognized as firing point has been solved, and performance and reliability of a system have been further improved.

*Description of reference numerals of major elements in the drawings*

| | |
|---|---|
| 100: shooting training system | |
| 200: computer device | 210: communication unit |
| 220: audio/video (A/V) input unit | 230: user input unit |
| 240: sensing unit | 250: output unit |
| 260: memory | 270: interface unit |
| 280: processing unit | 290: power supply unit |
| 300: beam projector | 350: fixing member |
| 400: camera module | 450: laser filter |
| 500: control unit | 600a, 600b: shooting device |
| 800: shooting screen | |

MODE FOR INVENTION

In order to achieve the object of the present invention, a shooting training system according to the present invention is a shooting training system using a laser beam and is configured to include:

a beam projector projecting various shooting training images comprising clay shooting, real-distance shooting and target shooting onto a shooting screen, a shooting device firing a specific laser beam at an aim point of a shooting screen in response to an aim and firing of a user, a camera module photographing the laser beam fired on the shooting screen, a computer device distinguishing between a hit and a miss by comparing a target area of a shooting training image projected onto the shooting screen with a point at which the laser beam is detected and outputting a corresponding image and sound, and a control unit detecting whether the shooting device has been fired and a firing time, wherein when the firing of the shooting device is checked through the control unit, the computer device detects the fired laser beam by driving the camera module.

Preferably, the computer device includes a display unit outputting the various shooting training images including clay shooting, real-distance shooting and target shooting through the beam projector, sound output module outputting a shooting device firing sound of a different sound depending on a hit or a miss, an interface unit receiving detected information from the control unit, and a processing unit determining a hit or a miss by comparing the target area of the output shooting training image with the point at which the laser beam is detected and outputting a corresponding image and sound.

Preferably, the processing unit includes a multimedia module providing a shooting training image, a laser beam recognition unit detecting a laser beam by scanning an image captured by the camera module, a coordinate calculation unit calculating coordinates of a point at which the laser beam is detected and displaying a shape fired at the corresponding point of the shooting training image, and a hit processing unit outputting an image and sound indicative of a hit to the shooting training image if the detected laser beam is determined to be a hit.

Preferably, the shooting device includes a laser module projecting a laser beam of a specific wavelength, a power source unit supplying power to the laser module, a switch connected to a trigger and turning on/off the laser module in response to firing, and a module holder unit fixing the laser module to a gun barrel so that a projection point of a laser beam is identical with an aiming point of a bead.

Hereinafter, preferred embodiments of the present invention are described with reference to the drawings.

Figure 1:
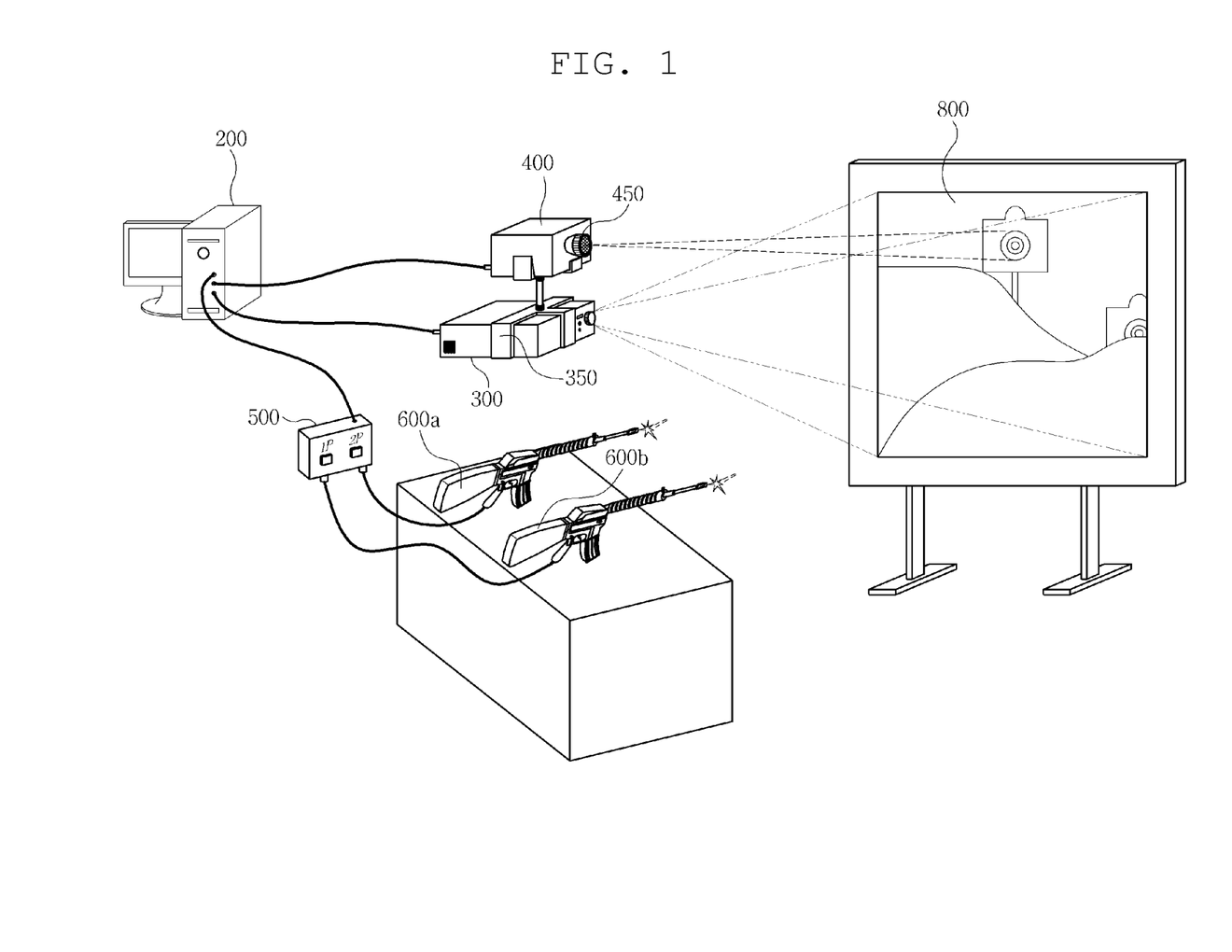
FIG. 1 is a diagram showing a shooting training system according to the present invention.

FIG. 1 is a diagram showing a shooting training system according to the present invention.

As shown in FIG. 1, the shooting training system 100 according to the present invention is a shooting simulation system, implemented to enable shooting game and shooting training using a laser beam, and basically includes a computer device 200, a beam, projector 300, a camera module 400, a control unit 500, and shooting devices 600a and 600b.

The beam projector 300 is a device that projects a slide or a moving image onto a screen using a laser. The beam projector is connected to the computer device 200 and projects various shooting training images (e.g., a training (game) program for clay shooting, real-distance shooting or target shooting), provided by the computer device 200, onto a screen 800.

A fixing member 350 is provided on one side of the body of the beam projector 300.

Although a user shoots a gun (radiates a laser beam) toward the shooting screen, the laser beam simply overlaps a shooting training image projected onto the shooting screen. The system 100 is unaware of whether a firing point (the detection point of a laser beam) has hit a target point of shooting training because the shooting screen is not equipped with a separate detection device.

Figure 5:
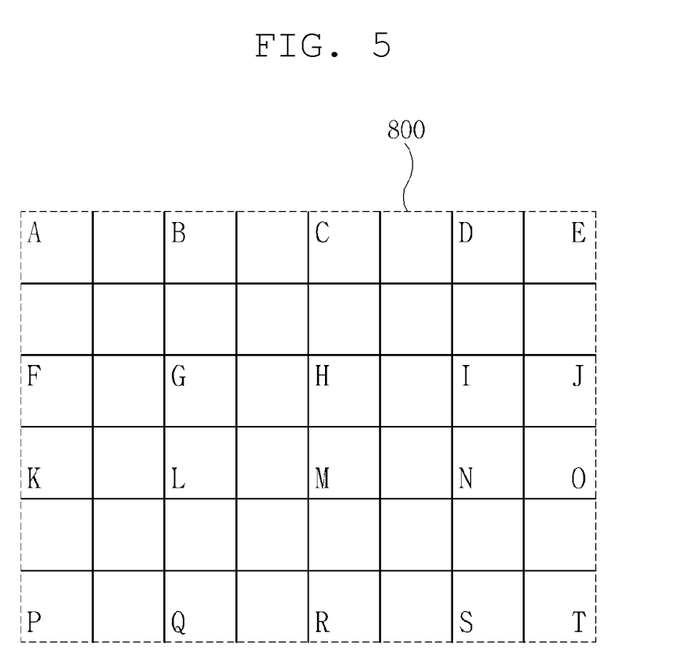
FIG. 5 is an exemplary diagram of screen location coordinates according to the present invention.

In order for the system 100 to determine whether a firing point has hit a target point of shooting training, as shown in FIG. 5, a task (hereinafter referred to as "location coordinate mapping") for mapping the location coordinates of each point on the screen 800 captured by the camera module 400 to a shooting program image projected onto the screen 800 is required so that the detection point of a laser beam is accurately indicated at a corresponding point of a shooting training image.

Furthermore, the up and lower and left and right angles of the camera module 400 that photographs the screen 800 and the up and lower and left and right angles of the beam projector 300 that projects a shooting training image onto the screen 800 must be fixed without being changed so that mapped location coordinates are not changed.

The fixing member 350 is a member that fixes the camera module 400 and the beam Projector 300 so that location coordinate mapping is not changed.

In the present invention, the beam projector 300 and the camera module 400 may be configured in an integrated form. In this case, the fixing member 350 is not necessary.

Figure 4:
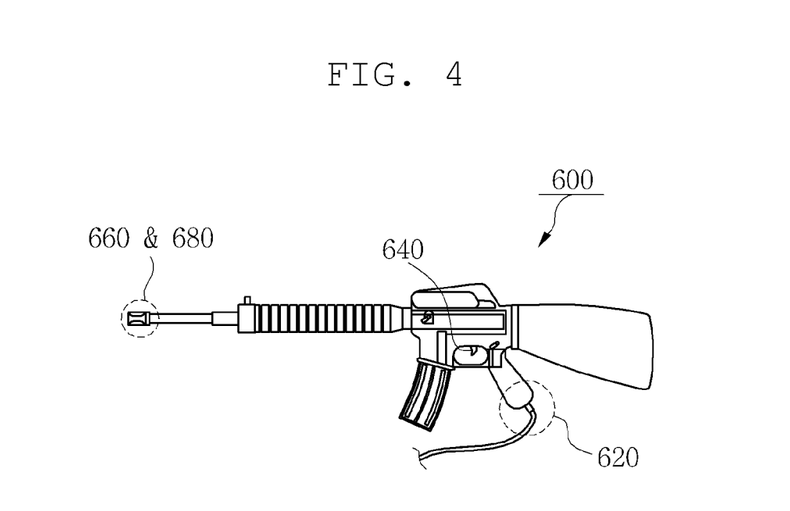
FIG. 4 is an exemplary diagram of a shooting device according to the present invention.

The shooting devices 600a and 600b may adopt a variety of types of arms available for shooting training or game. As shown in FIG. 4, the shooting device may have the same size and weight as a real gun, but the weight and size may be reduced so that children or women can easily use the shooting device. FIG. 4 is an exemplary diagram of a shooting device according to the present invention.

The shooting device 600a, 600b includes a sight and bead at the same point as those of a real gun so that precise and accurate shooting training are made possible, and fires a specific laser beam at the aim point of the shooting screen 800 in response to the aim and firing of a user.

The camera module 400 photographs a laser beam radiated on the shooting screen.

The camera module 400 includes a laser filter 450 that detects only a red laser beam of a wavelength of a 650±5 nm band in a surrounding light source, such as natural light (sun) the light source of a beam projector, a fluorescent lamp or an incandescent lamp.

The laser filter 450 is inserted into a cap (filter cap) of a size slightly larger than a camera lens and is preferably coupled to the lens portion of the camera in a detachable manner. The filter cap is worn on the camera lens so that only a red laser beam is recognize upon shooting, and location coordinate mapping is set. When setting information of the system is changed, however, the task is performed after removing the filter cap from the camera lens.

If the laser filter 450 is not mounted on the camera module 400, a surrounding light source (e.g., natural light (sun), the light source of a beam projector, a fluorescent lamp or an incandescent lamp) within the shooting range and red light of a laser cannot be distinguished accordingly, there is a problem in that reliability in performance of the system is deteriorated because the firing point of a laser beam is not captured or another point is erroneously recognized as a firing point.

The control unit 500 detects whether the shooting device has been fired and a firing time.

The control unit 500 includes two mode selection buttons so that a user may select a shooting mode (e.g., single mode or a double mode). Furthermore, the control unit 500 supplies power to the shooting devices 600a and 600b.

If a user who aims at a target triggers the trigger of the shooting device 600a or 600b and thus firing is performed, the control unit 500 detects the firing and transfers the detected information (e.g., information about whether the shooting device has been fired and a firing time) to the computer device 200.

In this example, for convenience of description, the shooting mode has been illustrated as being the single and double modes only, but may be used for training in a military camp, and may provide a mode for four or a mode for nine for combat training or squad combat shooting training. Furthermore, the shooting mode may provide shooting mode for a variety of the number of persons.

When the firing of the shooting device 600a or 600b is checked through the control unit 500, the computer device 200 detects (photographs) a fired laser beam by driving the camera module 400.

The computer device 200 distinguishes between a hit and a miss by comparing the target area of a shooting training image projected onto the shooting screen with the detection point of a photographed laser beam, and outputs a corresponding image and sound to the shooting screen 800.

Figure 2:
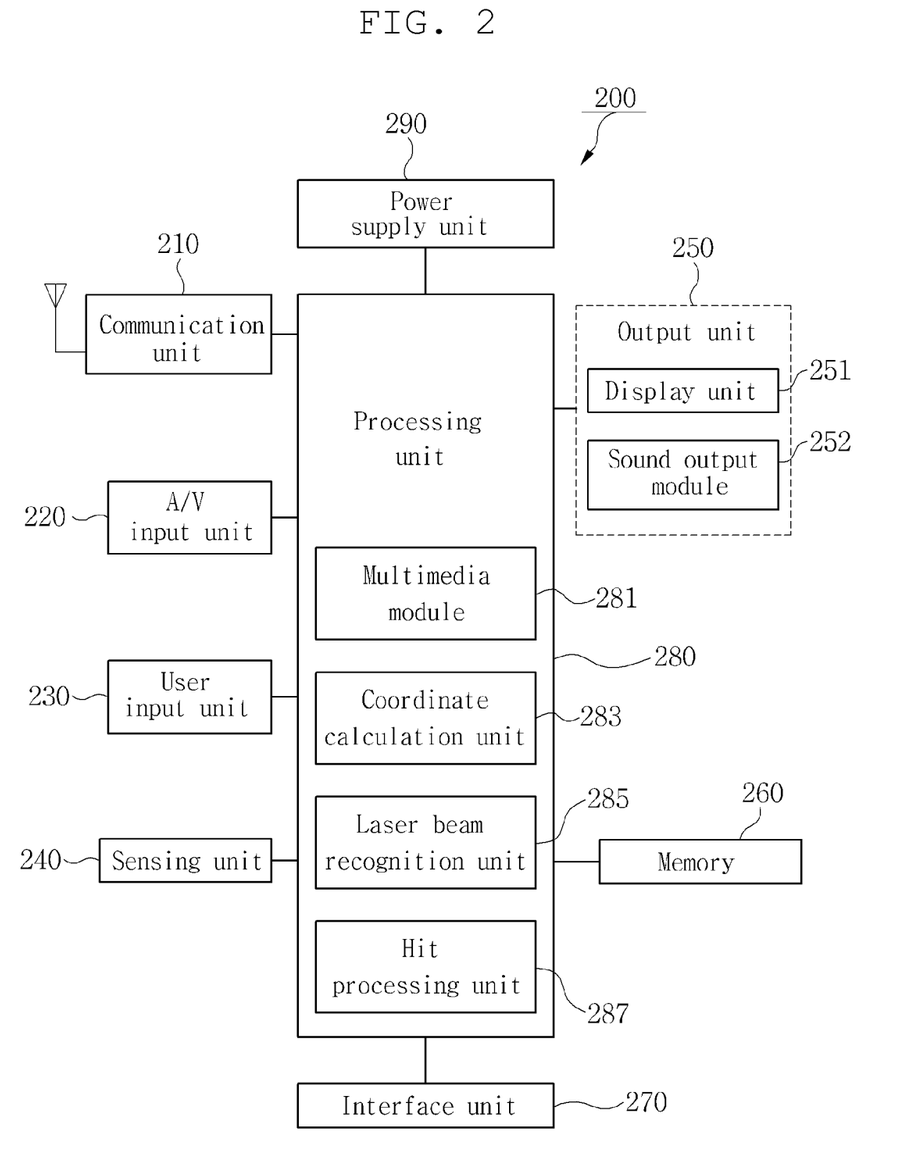
FIG. 2 is a block diagram of a computer device according to the present invention.

FIG. 2 is a block diagram of a computer device according to the present invention.

The computer device 200 according to the present invention may be a terminal, such as a desktop computer, a tablet computer, a notebook computer or personal digital assistants (PDA).

From a function and H/W viewpoint, the configuration of the computer device 200 is described below with reference to FIG. 2.

The computer device 200 may include elements, such as a communication unit 210, an audio/video (A/V) input unit 220, a user input unit 230, a sensing unit 240, an output unit 250, memory 260, an interface unit 270, a processing unit 280 and a power supply unit 290.

The communication unit 210 may include one or more elements that perform communication between the computer device 200 and a communication system or communication between the computer device 200 and a network in which the computer device 200 is located.

The audio/video (A/V) input unit 220 is for the input of an audio signal or video signal, and processes an image frame of a still image or moving image captured through the camera module 400. Furthermore, the processed image frame may be displayed on the display unit 151.

The user input unit 230 generates input data that enables a user to control the operation of a terminal. The user input unit 230 may include a key pad, a dome switch, a touch pad (touch pad (resistive/capacitive)), a jog wheel or a jog switch.

The sensing unit 240 detects the current state of the computer device 200, such as the location of the computer device 200 and whether a user has been touched, and generates a sensing signal for controlling the operation of the computer device 200. For example, the sensing unit 240 is responsible for a sensing function, such as whether the power supply unit 290 supplies power and whether the interface unit 270 is connected to an external device.

Furthermore, the interface unit 270 may become a passage through which power of the control unit 500 is supplied from the computer device 200 when the computer device 200 is connected to the outside cradle (e.g., the control unit 500) or may become a passage through which a variety of types of information (e.g., information related to firing or information related to mode) input to the control unit 500 by a user is delivered to the computer device 200. The variety of types of information or power received from the control unit 500 may operate as a signal for recognizing that the computer device 200 has been correctly mounted on the control unit 500.

The output unit 250 is for generating output related to the sense of sight or the sense of hearing, and may include a display unit 251 and a sound output module 252.

The display unit 251 displays (outputs) information (e.g., various shooting training images) processed by the computer device 200. For example the display unit displays various shooting training images (e.g., a training (game) program for clay shooting, real-distance shooting or target shooting) and a related user interface (UI) or a graphic user interface (GUI) provided by the computer device 200.

The display unit 251 includes at least one of a liquid crystal display, a thin film transistor-liquid crystal display, organic light-emitting diodes, flexible display, and a 3D display. The computer device 200 according to the present invention does not include a separate display panel and may display variety of types of information through the beam projector 300. That is, variety of types of information processed by the computer device 200, a shooting training image (e.g., a training (game) program for clay shooting, real-distance shooting or target shooting), and a related user interface (UI) and a graphic user interface (GUI) may be displayed on the screen 800 without a separate display device.

The sound output module 252 outputs audio data received from the communication unit 210 or stored in the memory 260. Furthermore, the sound output module 252 outputs various sounds or sound effects output by a shooting training program and outputs a sound signal according to the hit or miss of a laser beam.

The sound output module 252 may include receiver, a speaker or a buzzer, and may output various sounds or sound effects while operating in conjunction with an external speaker device installed in a shooting range.

The memory 260 may store a program a shooting training (game) program) for the processing and control of the processing unit 280, and may store input/output data (e.g., shooting result information, a still image and moving image of a user).

The memory 260 may include a storage medium of at least one type of a flash memory type, a hard disk type, a multimedia card micro type, memory of a card type (e.g., SD or XD memory), random access memory (RAM) static random access memory (SRAM), read-only memory (ROM), electrically erasable programmable read-only memory (EEPROM), programmable read-only memory (PROM) magnetic memory, a magnetic disk, and an optical disk or virtual memory on a web or a cloud storage medium.

The Power supply unit 290 is supplied with external power and internal power under the control of the processing unit 280 and supplies power necessary for the operations of the elements.

The processing unit 280 controls the operation of the computer while operating in conjunction with the elements 210, 220, 230, 240, 250, 260, 270 and 290 of the computer.

When the firing of the shooting device 600a or 600b is checked through the control unit 500, the processing unit 280 detects (photographs) a laser beam projected onto the screen 800 by driving the camera module 400.

In the case of the double shooting mode, the processing unit 280 detects (photographs) a laser beam projected onto the screen 800 by driving the camera module 400 whenever firing is performed. Accordingly, the processing unit 280 determines that the firing has been performed by which shooting device based on a firing time difference, and displays the firing point of a shooting training image in a different shape or color for each shooting device.

Furthermore, the processing unit 280 analyzes a hit or a miss by comparing the target area of a shooting training image projected onto the screen 800 with the detection point of a photographed laser beam, and outputs an image and sound according to a result (e.g., a hit or a miss) of the analysis through the screen 800 and a speaker.

As shown in FIG. 2, the processing unit 280 may include a multimedia module 281, a coordinate calculation unit 283, a laser beam recognition unit 285 and a hit processing unit 287.

The multimedia module 281 may be implemented within the processing unit 280 or may be implemented separately from the processing unit 280.

The multimedia module 281 provides a shooting simulation image for clay shooting, real-distance shooting or target shooting in which shooting training and shooting game can be performed in parallel. A user may select the type of shooting simulation (e.g., clay shooting, real-distance shooting or target shooting), a level (e.g., easy or hard), and a mode (e.g., single or double) through a shooting simulation image, and may perform corresponding shooting training or shooting game.

When the camera module 400 is driven to photograph a laser beam projected onto the screen 800, the laser beam recognition unit 285 detects a red laser beam by scanning the captured image.

The laser beam recognition unit 285 detects a laser beam fired for target shooting and also detects a laser beam fired for the selection of a desired item.

When shooting simulation image screen in which the type of shooting simulation (e.g., clay shooting, real-distance shooting or target shooting), a difficulty level (e.g., easy or hard) of shooting, and a mode (e.g., single or double) can be selected is output (projected) to the screen 800, a user according to the present invention may select a corresponding item by aiming the shooting device 600a or 600b at a required point (e.g., selection button) and firing a gun.

For example, if the difficulty level (e.g., easy or hard) of shooting is selected, when a corresponding image screen is output (projected) to the screen 800 and a user aims at an "easy" selection button and fires a gun, the camera module 400 is driven to photograph a laser beam projected onto the screen 800. The laser beam recognition unit 285 detects a laser beam projected on one side (e.g., on the "easy" selection button) of an image by scanning the captured image.

The coordinate calculation unit 283 calculates the coordinates of a point at which a laser beam is detected, and displays a shape fired at a corresponding point of a shooting training image. Furthermore, the coordinate calculation unit performs the "location coordinate mapping" task. In the case of the double shooting mode, the coordinate calculation unit 283 displays a fired shape in a different form or color for each shooting device 600a, 600b.

In the present invention, the "location coordinate mapping" task is performed so that the system 100 can check whether a firing point (point at which a laser beam was fired) is identical with a target point of shooting training, that is, whether a target point has been hit.

For the location coordinate mapping, first, when the processing unit 280 projects location coordinates, such as those shown in FIG. 5, onto the screen 800, a user projects a laser beam onto a length and breadth intersection and inputs a coordinate name A~T of the corresponding intersection. In response thereto, the camera module 400 is driven to photograph the laser beam projected onto the intersection, and the laser beam recognition unit 285 detects the laser beam by scanning the captured image.

Furthermore, the coordinate calculation unit 283 maps the coordinates of a point at which the laser beam is detected to the corresponding point of a shooting training image.

Such a task is repeatedly performed up to the intersections of A to T. Through such a task, the coordinate calculation unit 283 maps all of the location coordinates A~T of FIG. 5, projected onto the screen 800, to the corresponding point of the shooting training image. FIG. 5 is an exemplary diagram of screen location coordinates according to the present invention.

The number of location coordinates is proportional to the precision of a shooting training image. FIG. 5 illustrates location coordinates A~T. In the present invention, 25 location coordinates A~Y may be used. Furthermore, the location coordinates A~Y may be extended to 30 or 35 or more in order to implement shooting training image of high precision.

The hit processing unit 287 determines whether the firing of a user has been hit by comparing the target area of a shooting training image projected onto the screen 800 with the detection point of a laser beam. If it is determined that the firing of the user has been hit, the hit processing unit 287 outputs an image and sound corresponding to the hit to the screen 800 and the speaker so that the user can be aware of the hit.

The processing unit 280 according to the present invention may be implemented in a computer-readable recording medium using software, hardware or a combination of them.

In accordance with a hardware implementation, the processing unit 280 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing a function. In some cases, the embodiments described in this specification may be implemented as the processing unit 280 itself.

Figure 3:
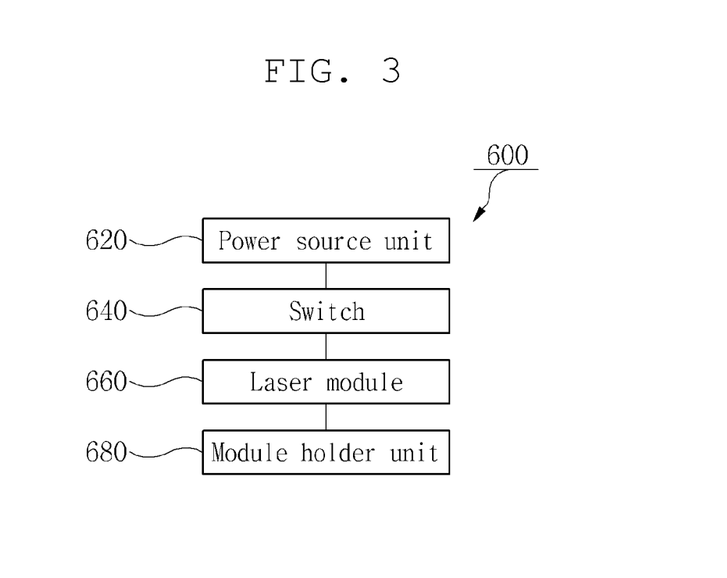
FIG. 3 is a block diagram of a shooting device according to the present invention.

FIG. 3 is a block diagram of the shooting device according to the present invention.

As shown in FIG. 3, the shooting device 600a, 600b according to the present invention includes a laser module 660, a power source unit 620, a switch 640 and a module holder unit 680, and fires a specific laser beam at an aim point of the shooting screen 800 in response to the aim and firing of a user.

The laser module 660 projects a red laser beam of a wavelength of a 650±5 nm band.

The power source unit 620 supplies power to the laser module 660.

The switch 640 is connected to the trigger. The switch blocks power supplied to the laser module 660 at normal times, and drives the laser module 660 by permitting the supply of power to the laser module 660 when the trigger is pulled to fire a gun.

The module holder unit 680 fixes the laser module 660 to a gun barrel so that the projection point of a laser beam is matched with the aiming point of the bead. A user adjusts the projection point of a laser beam so that the projection point is identical with the aiming point of the bead by manipulating the module holder unit 680.

Although the present invention has been described with reference to the embodiment(s) shown in the drawings, this is only illustrative. A person having ordinary knowledge in the art will understand that the present invention may be modified in various ways and some or all of the aforementioned embodiment(s) may be selectively combined. Accordingly, the true range of protection of the present invention should be determined by the technical spirit of the following claims.

As described above, the present invention implements the shooting training system using a laser beam so that upon firing, laser beam appears at an aimed point and whether a target was hit can be checked. Furthermore, the present invention has reproduced a psychological effect and attributes obtained through shooting because a user can check his or her zeroing with the naked eye.

Furthermore, in the present invention, the laser filter 450 is mounted on the camera module 400 so that the camera module 400 can recognize only a laser beam of gun by distinguishing between surrounding light sources (e.g., natural light, (sun), the light source of a beam projector, a fluorescent lamp and an incandescent lamp) within a shooting range. Accordingly, a conventional error that a firing point of a laser beam not captured or another point is recognized as a firing point has been solved, and performance and reliability of a system have been further improved.

The invention claimed is:

1. A shooting training system using a laser beam, comprising:
   a beam projector projecting various shooting training images comprising clay shooting, real-distance shooting and target shooting onto a shooting screen,
   a shooting device firing a specific laser beam at an aim point of a shooting screen in response to an aim and firing of a user,
   a camera module photographing the laser beam fired on the shooting screen,
   a computer device distinguishing between a hit and a miss by comparing a target area of a shooting training image projected onto the shooting screen with a point at which the laser beam is detected and outputting a corresponding image and sound, and
   a control unit detecting whether the shooting device has been fired and a firing time,
   wherein when the firing of the shooting device is checked through the control unit, the computer device detects the fired laser beam by driving the camera module,
   wherein the computer device comprises:
      a display unit outputting the various shooting training images comprising clay shooting, real-distance shooting and target shooting through the beam projector,
      a sound output module outputting a shooting device firing sound of a different sound depending on a hit or a miss,
      an interface unit receiving detected information from the control unit, and
      a processing unit determining a hit or a miss by comparing the target area of the output shooting training image with the point at which the laser beam is detected and outputting a corresponding image and sound,
   wherein the processing unit comprises:
      a multimedia module providing a shooting training image,
      a laser beam recognition unit detecting a laser beam by scanning an image captured by the camera module,
      a coordinate calculation unit calculating coordinates of a point at which the laser beam is detected and displaying a shape fired at the corresponding point of the shooting training image, and
      a hit processing unit outputting an image and sound indicative of a hit to the shooting training image if the detected laser beam is determined to be a hit,
   wherein
      the control unit comprises a selection button through which a user is capable of selecting a single or multiplayer mode,
      when the multiplayer mode is selected, the control unit detects whether each shooting device has been fired and a firing time,
   wherein in the multiplayer mode, the computer device determines firing has been performed by which shooting device with reference to a firing time and displays a firing point of a shooting training image in a different shape or color for each shooting device, and
   wherein the shooting device comprises:
      a laser module projecting a laser beam of a specific wavelength,
      a power source unit supplying power to the laser module,
      a switch connected to a trigger and turning on/off the laser module in response to firing, and
      a module holder unit fixing the laser module to a gun barrel so that a projection point of a laser beam is identical with an aiming point of a bead.

2. The shooting training system of claim 1, wherein the camera module comprises a laser filter detecting only a laser beam of a specific wavelength in surrounding light comprising natural light, a light source of a beam projector, a fluorescent lamp or an incandescent lamp.

3. The shooting training system of claim 1, further comprising a fixing member for fixing the camera module and the beam projector so that mapped location coordinates are not changed when location coordinate mapping by which a detection point of a laser beam is precisely displayed at a corresponding point of the shooting training image is set.

4. The shooting training system of claim 1, wherein the laser module projects a red beam of a 650±5 nm band.

* * * * *